United States Patent
Iwaida et al.

(10) Patent No.: US 6,778,379 B2
(45) Date of Patent: Aug. 17, 2004

(54) GRANULES FOR ELECTRODE, METHOD FOR MANUFACTURING THEREOF, ELECTRODE SHEET, POLARIZABLE ELECTRODE AND ELECTRIC DOUBLE-LAYER CAPACITOR

(75) Inventors: Manabu Iwaida, Saitama (JP); Shigeki Oyama, Saitama (JP); Kenichi Murakami, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/721,360

(22) Filed: Nov. 26, 2003

(65) Prior Publication Data

US 2004/0105216 A1 Jun. 3, 2004

(30) Foreign Application Priority Data

Nov. 29, 2002 (JP) .................................. 2002-349264

(51) Int. Cl.$^7$ ................................................. H01G 9/00
(52) U.S. Cl. ........................................ 361/502; 29/25.03
(58) Field of Search .......................... 361/502, 503–517; 29/25.03

(56) References Cited

U.S. PATENT DOCUMENTS

| | | | | |
|---|---|---|---|---|
| 5,786,981 A | * | 7/1998 | Aoki et al. | 361/502 |
| 5,949,637 A | * | 9/1999 | Iwaida et al. | 361/502 |
| 6,195,251 B1 | * | 2/2001 | Suhara et al. | 361/502 |

FOREIGN PATENT DOCUMENTS

JP    7-105316    11/1995

\* cited by examiner

*Primary Examiner*—Dean A. Reichard
*Assistant Examiner*—Eric Thomas
(74) *Attorney, Agent, or Firm*—Arent Fox PLLC

(57) ABSTRACT

An electrode sheet for an electric double-layer capacitor is provided. The electrode sheet is molded from granules which are produced from ingredients including an electrochemically active material, an electrically conductive filler and a binder. A contact angle is equal to or less than 100 degrees when the contact angle is defined as (180-ALPHA) degrees, where ALPHA represents an apex angle of a droplet of an electrolytic solution for the electric double-layer capacitor, and when the droplet lies on the electrode sheet.

4 Claims, 11 Drawing Sheets $180° - \alpha \leq 100°$ $180° - \alpha > 100°$

FIG.7

| Kneading Time Period(min) | Contact Angle(deg.) | Electrical Resistance($\Omega \cdot cm^2$) | Electrostatic Capacity (F/cubic centimeter) |
|---|---|---|---|
| 2 | 10 | 6.5 | 15 |
| 4 | 35 | 6.6 | 17 |
| 6 | 60 | 6.7 | 18 |
| 8 | 86 | 6.7 | 18 |
| 10 | 101 | 7.2 | 18 |
| 20 | 28 | 6.5 | 16 |

FIG.8

| TEFRON Mass Ratio(%) | Contact Angle(deg.) | Electrical Resistance(Ω·cm$^2$) | Electrostatic Capacity (F/cubic centimeter) |
|---|---|---|---|
| 6 | 72 | 6.5 | 18 |
| 10 | 86 | 6.7 | 18 |
| 12 | 98 | 6.8 | 17 |
| 16 | 113 | 7.6 | 14 |

FIG.9

| | Mass Ratio | Kneading Time Period (min.) | Contact Angle (deg.) | Electrical Resistance ($\Omega \cdot cm^2$) | Electrostatic Capacity (F/cubic centimeter) |
|---|---|---|---|---|---|
| Sample 2 | 82:8:10 | 2 | ≤10 | 6.5 | 15 |
| Sample 3 | 82:8:10 | 4 | 35 | 6.6 | 17 |
| Sample 4 | 82:8:10 | 6 | 60 | 6.7 | 18 |
| Sample 1 | 82:8:10 | 8 | 86 | 6.7 | 18 |
| Reference 1 | 82:8:10 | 10 | 101 | 7.2 | 18 |
| Sample 5 | 82:8:10 | 20 | 28 | 6.5 | 16 |
| Sample 6 | 86:8:6 | 8 | 72 | 6.5 | 17 |
| Sample 7 | 80:8:12 | 8 | 98 | 6.8 | 17 |
| Reference 1 | 76:8:16 | 8 | 113 | 7.2 | 14 |

GRANULES FOR ELECTRODE, METHOD FOR MANUFACTURING THEREOF, ELECTRODE SHEET, POLARIZABLE ELECTRODE AND ELECTRIC DOUBLE-LAYER CAPACITOR

FIELD OF THE INVENTION

The present invention relates to an electrode sheet for an electric double-layer capacitor, a method for its manufacturing, a polarizable electrode and an electric double-layer capacitor using the polarizable electrode.

BACKGROUND OF THE INVENTION

An electric double-layer capacitor, which has high capacitance of farad class, excellent characteristics of charge/discharge cycle and the capability of undergoing rapid charge, has been used for a backup power supply of electronic component, an onboard battery for a vehicle (an energy buffer) and the like.

An electric double-layer capacitor is briefly described referring to FIG. 1.

FIG. 1 is a sectional view showing the main structure of an electric double-layer capacitor.

As shown in FIG. 1, an electric double-layer capacitor 101 includes a casing 102 housing a pair of carbon electrodes (polarizable electrodes) 104 which interposes a separator 103, and a pair of collectors (elements) 105. And the casing 102 is filled with an ion conductive electrolytic solution. The electric double-layer capacitor 101 employs electric charges (shown by + and − in FIG. 1) as dielectrics in a normal capacitor, which are generated at an interface between the solid carbon electrodes 104 and the liquid electrolytic solution, and spaced at a distance of molecule.

Electrolytic solutions used for electric double-layer capacitors are roughly categorized into an aqueous electrolytic solution made of a dilute sulfuric acid added with an electrolyte and an organic electrolytic solution made of an organic solvent added with an electrolyte. An appropriate type of electrolytic solution is selectably applied to an electric double-layer capacitor taking into account its usage. An electric double-layer capacitor using an aqueous electrolytic solution is advantageous in terms of lower internal resistance and higher power density. On the other hand, an organic electrolytic solution, which allows a higher withstand voltage per cell, is advantageous in terms of energy density. It also allows selection of inexpensive and light metals such as an aluminum alloy for a casing.

A method for manufacturing an electrode sheet is generally used, which has a process of mixing an electrochemically active material such as activated carbon, an electrically conductive filler such as carbon black and a binder such as polytetrafluoroethylene (PTFE). Japanese Patent Publication 07-105316 (Japanese Published Patent Application 63-107011) reports the related art.

Japanese Patent Publication 07-105316 does not fully explain the interaction between an electrode sheet and an electric double-layer capacitor, although the document introduces the parameters such as the porosity and Gurley number of electrode sheet. This has necessitated establishment of a criterion, which is applicable to manufacturing of an electrode sheet. Especially, the criterion for electrode sheet, which is used for an electric double-layer capacitor that has low electrical resistance and stable performance, has been in great demand.

SUMMARY OF THE INVENTION

In the circumstances, the present invention provides an electrode sheet and its manufacturing method, which enable manufacturing of this type of electric double-layer capacitor. The present invention also provides a polarizable electrode including the electrode sheet and the electric double-layer capacitor using the polarizable electrode.

Applicants have found that a contact angle between an electrode sheet and a droplet of electrolytic solution can be controlled so that an electric double-layer capacitor can have low electrical resistance and stable performance. The applicants have also discovered that the desirable contact angle can be obtained by manufacturing the granules for electrode sheet under preferably selected conditions of process associated with kneading.

An aspect of the present invention provides an electrode sheet for an electric double-layer capacitor, and the electrode sheet is molded from granules which are produced from ingredients including an electrochemically active material, an electrically conductive filler and a binder. In this aspect, a contact angle is equal to or less than 100 degrees when the contact angle is defined as (180-ALPHA) degrees, where ALPHA represents an apex angle of a droplet of an electrolytic solution for the electric double-layer capacitor, and when the droplet lies on the electrode sheet.

In this way, it is possible to obtain the electrode sheet described above, which can be used for the electric double-layer capacitor having stable performance and low electrical resistance due to improvement in wetness.

Another aspect of the present invention provides a method for manufacturing an electrode sheet for an electric double-layer capacitor. The electrode sheet is molded from granules which are produced from ingredients including an electrochemically active material, an electrically conductive filler and a binder. The method includes the steps of (a) kneading the ingredients so that the binder is subjected to fibrillation, and molding a lump out of the ingredients after the fibrillation, (b) crushing the lump into granules for the electrode sheet of the electric double-layer capacitor and (c) forming the granules into the electrode sheet. In this aspect, one of a period of time and strength of kneading at the step (a) is adjusted so that a contact angle can be equal to or less than 100 degrees when the contact angle is defined as (180-ALPHA) degrees, where ALPHA represents an apex angle of a droplet of an electrolytic solution for the electric double-layer capacitor, and when the droplet lies on the electrode sheet.

The electrode sheet described above allows repetitive manufacturing of an electric double-layer capacitor that has lower electric resistance and stable performance.

In this connection, the period of time and the strength correlated with the contact angle less than (180-ALPHA) degrees have been demonstrated by an experiment or a simulation based on data obtained by the experiment. The conditions applied to the experiment, which include ingredients, a mixing ratio, a thickness of electrode sheet and a method of manufacturing, are fixed for the experiment and simulation.

It is preferable to select classified granules having a particle diameter of 47–840 micron meters for manufacturing the electrode sheet according to the present invention.

The granules selected this way prevent fine particles of carbon and electrically conductive filler from separating or desorbing from the electrode sheet, so that they may not float in an electrolytic solution or exist between separators. It will enable manufacturing of the electric double-layer capacitor, which has high efficiency in terms of voltage maintenance.

Still another aspect of the present invention provides a polarizable electrode for an electric double-layer capacitor, including an electrode sheet and a collector foil. The electrode sheet is molded from granules which are produced from ingredients, including an electrochemically active material, an electrically conductive filler and a binder. The collector foil is bonded with the electrode sheet directly or via a layer of an adhesive so as to form the polarizable electrode. In this aspect, a contact angle is equal to or less than 100 degrees when the contact angle is defined as (180-ALPHA) degrees, where ALPHA represents an apex angle of a droplet of an electrolytic solution for the electric double-layer capacitor, and when the droplet lies on the electrode sheet.

The polarizable electrode for the electric double-layer capacitor described above has high efficiency in terms of voltage maintenance as well as the electrode sheet according to the present invention.

Yet another aspect of the present invention provides an electric double-layer capacitor including the polarizable electrode described above.

This electric double-layer capacitor has not only low electric resistance but also stable performance.

BRIEF DESCRIPTION OF THE DRAWINGS

FIG. 7 is a table showing the measurement results of sample 1, a contact angle, electric resistance and electrostatic capacity with regard to a kneading time period.

FIG. 8 is a table showing the measurement results of sample 1, a contact angle, electric resistance and electrostatic capacity with regard to a TEFLON mass ratio.

FIG. 9 is a table showing the measurement results of samples 2–7, which have different kneading time periods and mass ratios for ingredients.

DESCRIPTION OF THE PREFERRED EMBODIMENTS

An embodiment of the present invention is now described with reference to the accompanying drawings.

a. Electric Double-layer Capacitor

An electrode sheet and an electric double-layer capacitor which uses polarizable electrodes according to the present invention are described, referring to FIGS. 2A and 2B and FIGS. 3A and 3B.

Figure 1:
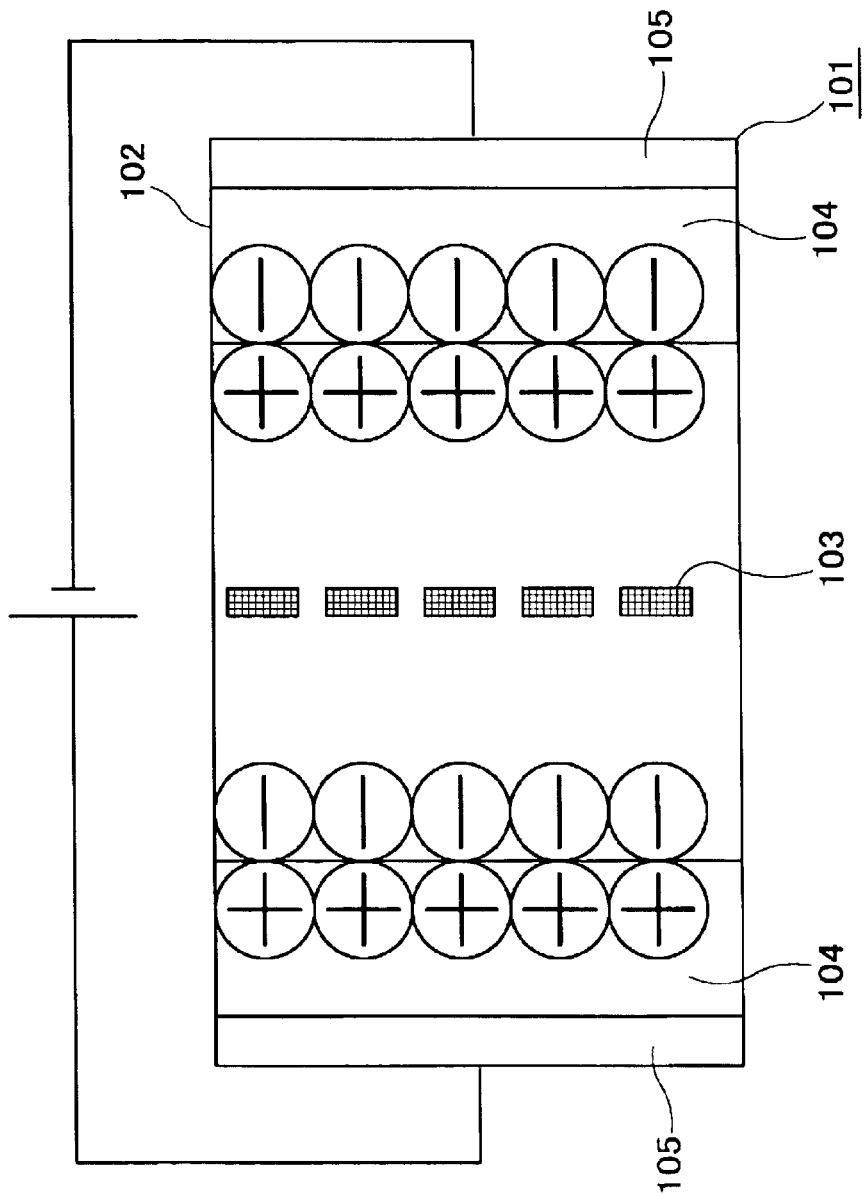
FIG. 1 is a sectional view showing an electric double-layer capacitor.
Figure 2A:
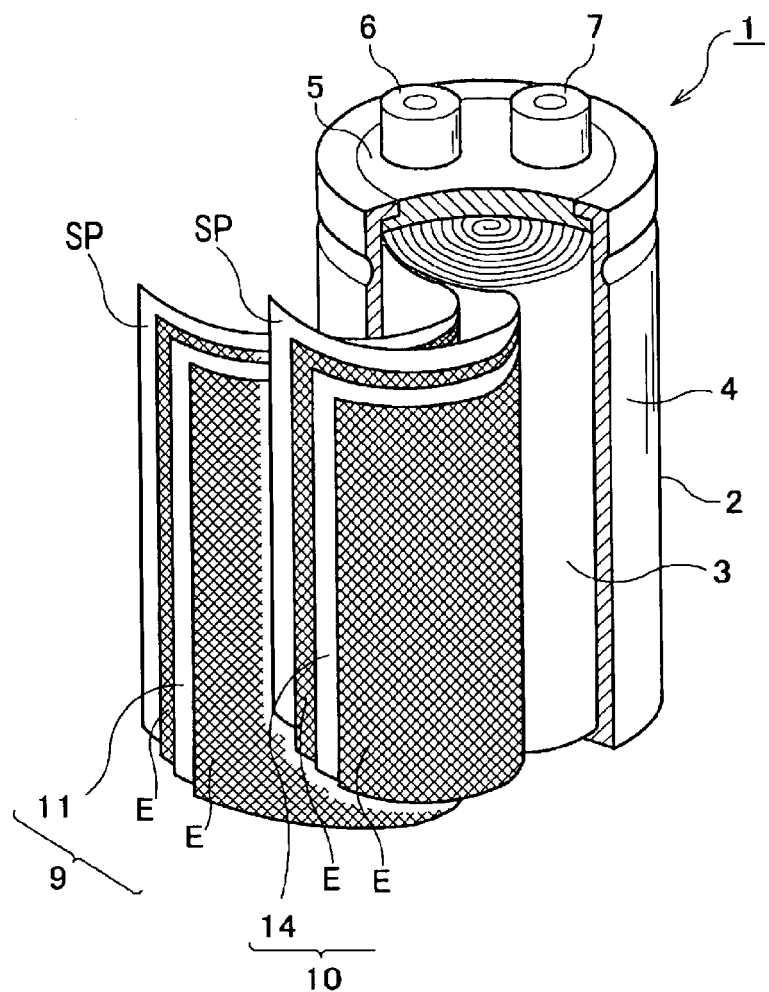
FIG. 2A is a schematic diagram showing an example of the electric double-layer capacitor according to the present invention.

An electric double-layer capacitor 1 shown in FIG. 2A mainly includes a cylindrical casing 2, a rolled electrode 3 which is made of polarizable electrodes 9, 10 and separators SP, and an electrolytic solution filled in the casing 2.

The casing 2 is, for example, made of an aluminum alloy taking into account easy processing and light weight. The casing 2 includes a cylindrical main body 4 with a base and a terminal plate 5 to close its opening, on which positive and negative terminals 6 and 7 are provided, respectively. The terminals 6 and 7 may be located on the opposite sides of the casing 2 instead.

As shown in FIG. 2A, the rolled electrode 3 has the polarizable electrode 9 as a positive electrode and the polarizable electrode 10 as a negative electrode.

The polarizable electrode 9 includes a collector foil 11 made of aluminum foil, on each surface of which an electrode sheet E is bonded with an electrically conductive adhesive to serve as a positive film electrode.

The polarizable electrode 10 includes a collector foil 14, on each surface of which an electrode sheet E is bonded with an electrically conductive adhesive to serve as a negative film electrode.

The positive and negative polarizable electrodes 9 and 10 are electrically separated by separators SP. The rolled electrode 3 is formed in such a manner that the positive and negative polarizable electrodes 9 and 10 are laminated interposing a separator SP.

In this connection, it may be possible to select a separator generally used in the related technical fields, for example paper mixed with resin such as porous olefinic resin (polyethylene or polypropylene) or paper mixed with fiber such as cellulose or polyester.

An electrolyte applied to the electric double-layer capacitor 1 can also be selected from electrolytes which have been used conventionally. Though it is not limited to those, following electrolytes can be named, for example: perchloric acid, hexafluoro phosphoric acid, tetrafluoro boric acid, tetraalkyl ammonium salt or amine salt of trifluoro alkyl sulfonic acid and tetraalkyl ammonium salt or amine salt of tetrafluoro alkyl sulfonic acid.

These electrolytes are solved into a polarizing solvent such as propylene carbonate, gamma butyl lactone, acetonitrile, dimethylhormamide, 1, 2-dimethoxy ethane, Sulfolan and nitro ethane, forming an electrolytic solution.

Figure 2B:
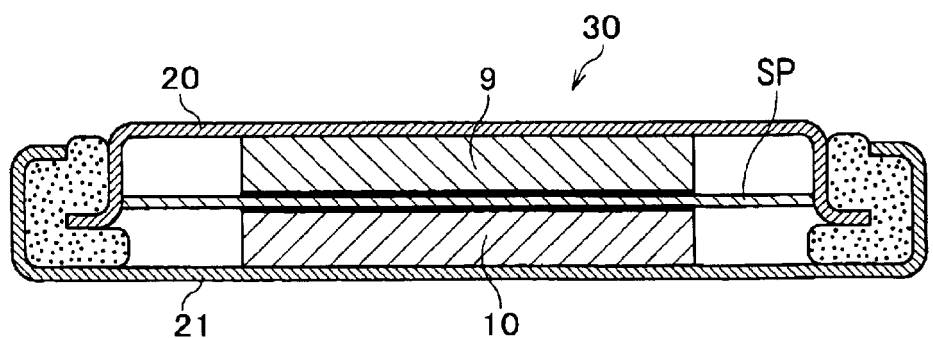
FIG. 2B is a sectional view showing an electric double-layer capacitor of coin-type.

The polarizable electrodes 9 and 10 shown in FIG. 2B, which are applied to an electric double-layer capacitor of coin type for example, are used without rolling different from those in the rolled electrode 3 as shown in FIG. 2A. The application of polarizable electrodes is flexible and this type of application of polarizable electrodes without rolling is also included in the scope of the present invention.

Description would be omitted for the items of an electric double-layer capacitor shown in FIG. 2B, which are the same as those shown in FIG. 2A, bearing the same symbols.

An electric double-layer capacitor 30 shown in FIG. 2B has a lamination of polarizable electrodes 9 and 10 and a separator SP, which is impregnated with an electrolytic solution.

Figure 3A:
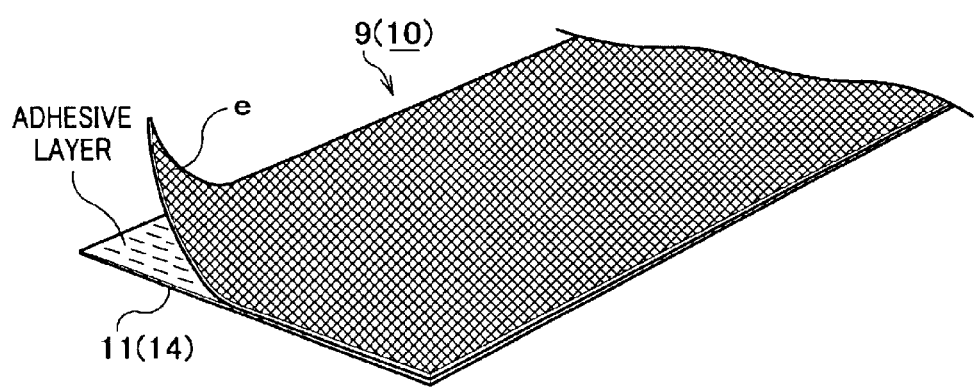
FIG. 3A is a schematic diagram showing a polarizable electrode used for an electric double-layer capacitor.
Figure 3B:
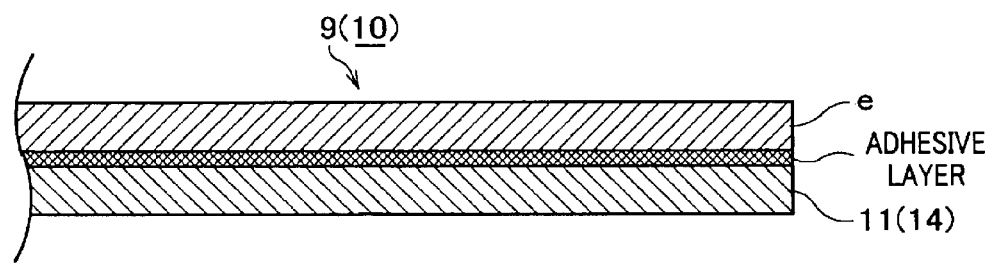
FIG. 3B is a sectional view of the polarizable electrode shown in FIG. 3A.

The polarizable electrode 9 and 10 are made of collector foils 11 and 14, both sides of which are bonded with electrode sheets E using an electrically conductive adhesive (refer to FIGS. 3A and 3B).

The positive polarizable electrode 9 and the negative polarizable electrode 10, which interpose the separator SP impregnated with the electrolytic solution, are housed in the housing made of two parts 20 and 21 to form the electric double-layer capacitor 30 of coin-type. In this connection, the upper casing 20 contacting the positive polarizable electrode 9 serves as a positive electrode, on the other hand the lower housing 21 as a negative electrode. The present invention can also be applied to this type of electric double-layer capacitor.

The polarizable electrodes 9 and 10 are described referring to FIGS. 3A and 3B. The polarizable electrodes 9 and 10 are made of collector foils 11 and 14 respectively, one or both surfaces of which are bonded with the electrode sheets E. It may be preferable to give surface treatment such as etching for the collector foils 11 and 14 to improve adhesion with the electrode sheets E. An electrode sheet E is molded out of ingredients including an electrochemically active material, an electrically conductive filler and a binder, and formed into a sheet-like shape by rolling.

The electrochemically active material for the electrode sheet E according to the present invention can be selected arbitrarily from known materials used for electric double-layer capacitors, such as activated carbon or carbon fiber. In order to obtain large electrostatic capacity, it may be possible to select activated carbon or activated carbon fiber having a large specific surface, preferably activated carbon produced from graphitized carbon with carbonization and subsequent alkali activation, mesophase pitch, for example.

There is no limitation for the average particle diameter of the electrochemically active material, and those having 1–50 micron meters, preferably 6 micron meters can be used. The mass ratio of electrochemically active material relative to the electrode sheet E according to the present invention falls in a known range, namely 50–97 mass percent. If an amount of electrochemically active material is short, it is not possible to realize desired electrostatic capacity. On the other hand, if it is excessive, electrical conductivity tends to deteriorate.

Electrically conductive fine powder used in the related technical field such as carbon black can be used for the electrically conductive filler, which is used for making an electrode conductive. A conventionally known value may be applied to the amount of filler according to the present invention, which is typically 1–30 mass percent. If the amount of filler is short, the electric conductivity of the electrode drops. On the other hand, if it is excessive, electrostatic capacity tends to decrease.

Various binders found in the related technical field can be used for the present invention. Though it is not limited, the following fluororesins can be named, for example: polytetrafluoroethylene (PTFE), ethylene-tetrafluoroethylene copolymer, chlorotrifluoroethylene polymer, fluorovinylidene polymer and tetrafluoroethylene-fluoroalkylvinylether copolymer. It is preferable to select PTFE in the present invention taking into account heat durability and chemical resistance.

An amount of binder, which is a part of granules of an electrode sheet, is an important parameter for determining a contact angle. As described later, the contact angle increases substantially proportional to the amount of binder. It is preferable to select an amount of 2–20 mass percent in the present invention. If the amount of binder is short, the binder can not work efficiently. On the other hand, if it is excessive, the electrostatic capacity of an electrode decreases. Also the contact angle tends to increase too much.

The electrode sheet E has surface characteristics, which allow a desirable range of contact angle between a droplet of electrolytic solution and the surface of electrode sheet E.

Figure 4A:
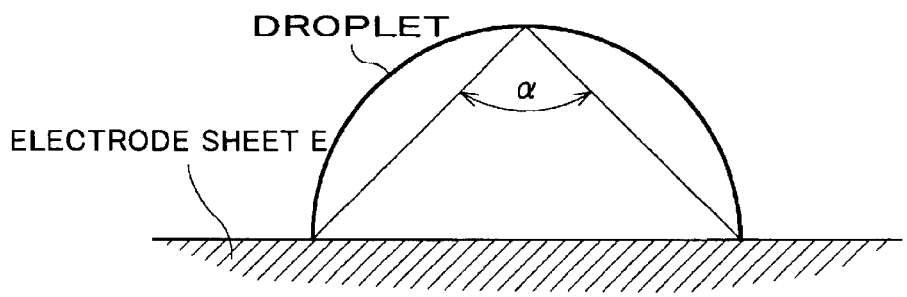
FIGS. 4A–4C are schematic diagrams illustrating the contact angle between an electrode sheet according to the present invention and a droplet of electrolytic solution.
Figure 4B:
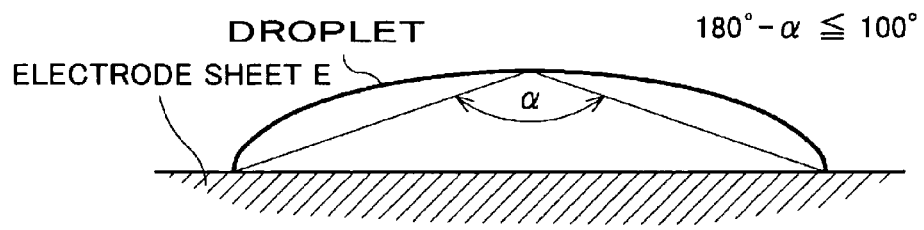
Figure 4C:
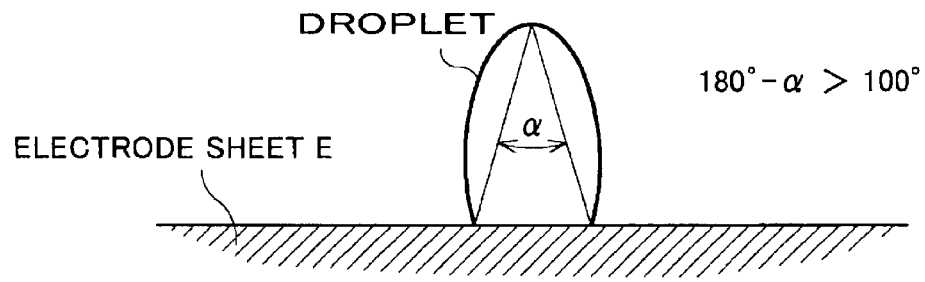

The contact angle is described in detail referring to FIGS. 4A–4C. As shown in FIG. 4A, the contact angle is defined as (180-ALPHA) degrees where ALPHA is an apex angle of the droplet when it is on the electrode sheet E.

The preferable contact angle of the present invention is less than or equal to 100 degrees, more preferably between 30 and 90 degrees. As shown in FIG. 4B, the wetness of an electrolytic solution to the electrode sheet E increases as the contact angle decreases, so that the electric resistance falls and the efficiency in terms of voltage maintenance rises accordingly. On the other hand as shown in FIG. 4C, when the contact angle grows exceeding the preferable range of the present invention, the wetness decreases and thereby the electric resistance increases.

Repeated experiments of the present invention have demonstrated that when the contact angle is less than or equal to 100 degrees, the electrode sheet E can work efficiently, so that the polarizable electrodes 9, 10 and the electric double layer capacitor 1 can also work well.

Once the contact angle exceeds 100 degrees, the electric resistance starts increasing remarkably. It results in a possible decrease in the output of the electric double-layer capacitor 1. On the other hand, the electrostatic capacity tends to fall as the contact angle decreases. The embodiment of the present invention has selected a preferable range of contact angle 30–90 degrees, which gives appropriate conditions for the electric double-layer capacitor 1 in terms of a balance between the electrostatic capacity and electric resistance that has an effect on the output of capacitor.

It is preferable to select a range of 47–840 micron meters for the diameter of granule used for the electrode sheet E.

If the granules for electrode sheet include those with a particle diameter less than 47 micron meters, these too fine granules remain on the surface of the electrode sheet E. They tend to peel off the surface of electrode sheet E during storage and subsequent processes as well as assembly of the electric double-layer capacitor 1. Especially, after the assembly of electric double-layer capacitor 1, these too fine granules peeled off the surface come into separators SP or float in an electrolytic solution, and thereby the efficiency for voltage maintenance may possibly drop.

In this connection, "a particle diameter" is related to an aperture diameter of sieve.

An electric double-layer capacitor 1 is assembled in the following manner, which has not only low electrical resistance but also high efficiency for voltage maintenance. First, granules with a predetermined range of diameter are formed into electrode sheets E, which are subsequently bonded with collector foils 11 and 14 to form polarizable electrodes 9 and 10 as shown in FIGS. 3A and 3B. The polarizable electrodes 9 and 10 are then installed into a casing 2 to complete the electric double-layer capacitor 1.

b. Manufacturing Method

Figure 5:
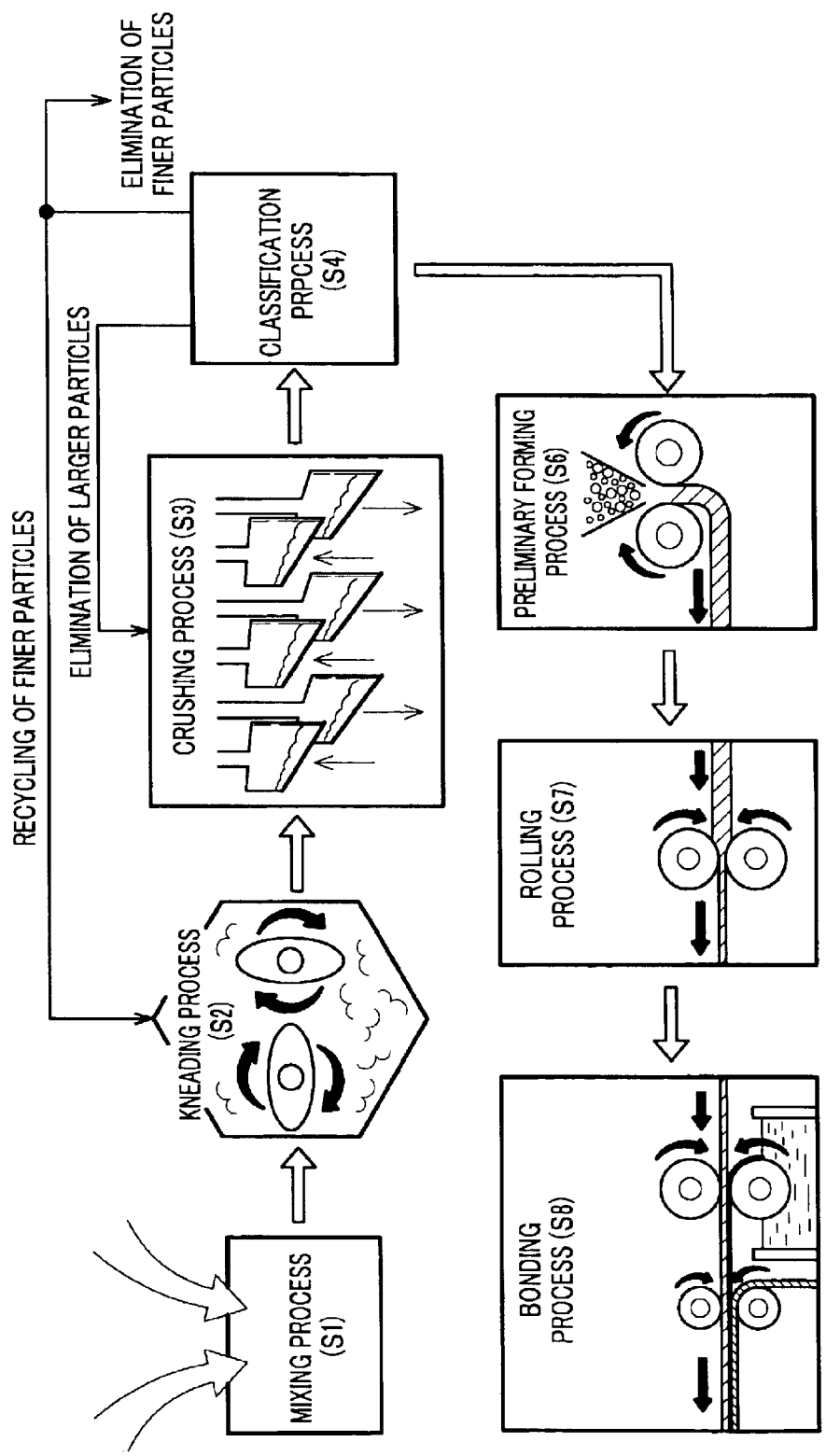
FIG. 5 is a flow diagram illustrating a flow applied to manufacturing of a polarizable electrode for an electric double-layer capacitor.
Figure 6:
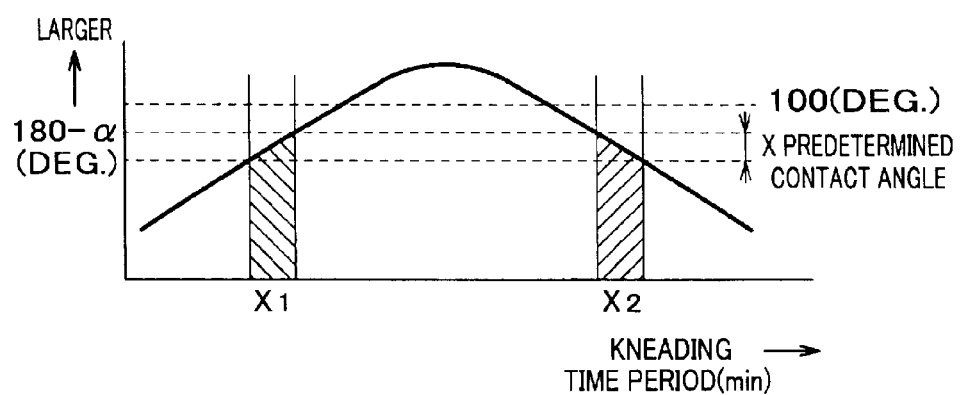
FIG. 6 is a graph showing the relationship between a kneading time period and a contact angle.
Figure 10A:
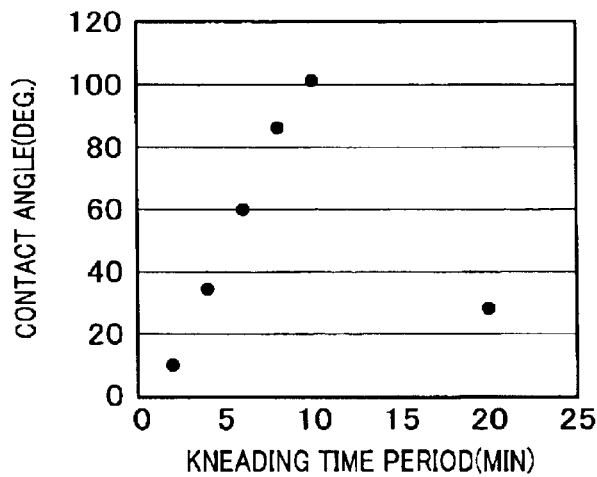
FIG. 10A is a graph showing the relationship between a kneading time period and a contact angle.
Figure 10B:
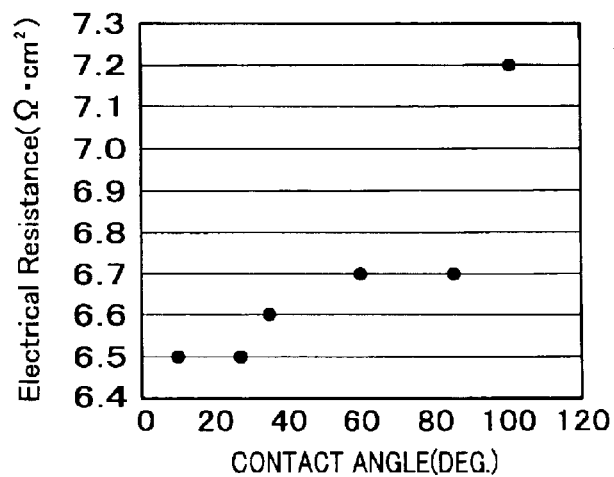
FIG. 10B is a graph showing the relationship between a contact angle and electrical resistance.
Figure 10C:
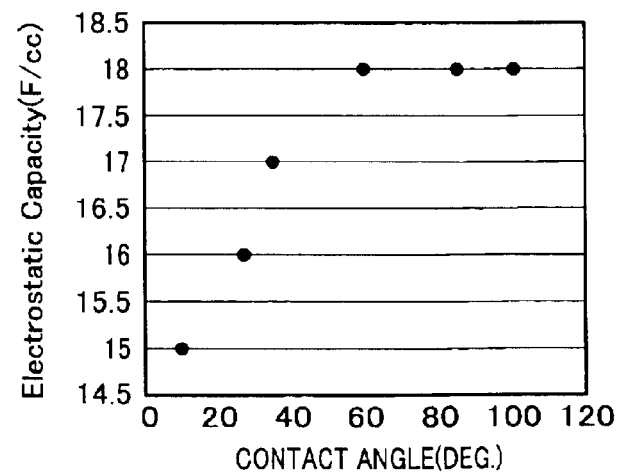
FIG. 10C is a graph showing the relationship between a contact angle and electrostatic capacity.
Figure 11A:
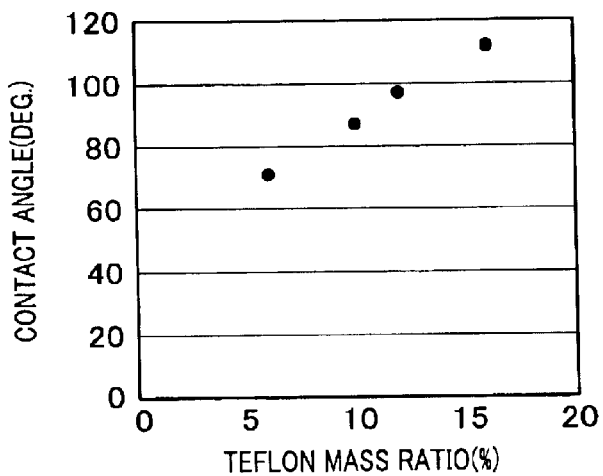
FIG. 11A is a graph showing the relationship between a TEFLON mass ratio and a contact angle.
Figure 11B:
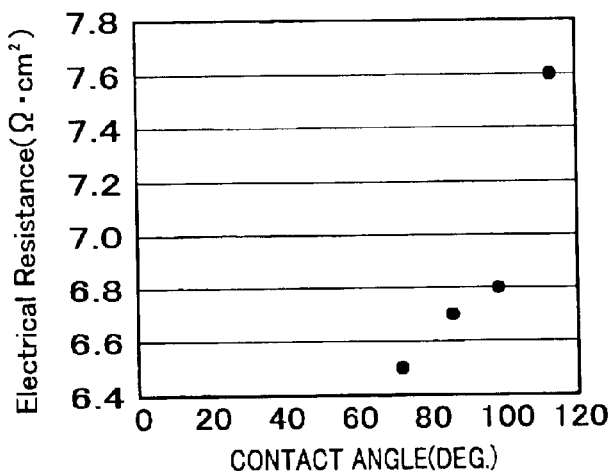
FIG. 11B is a graph showing the relationship between a contact angle and electrical resistance.
Figure 11C:
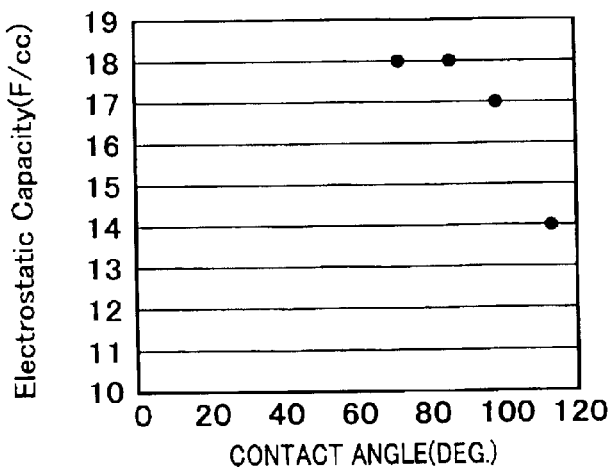
FIG. 11C is a graph showing the relationship between a contact angle and electrostatic capacity.

A method for manufacturing the electrode sheets E and the polarizable electrodes 9 and 10 for the electric double-layer capacitor 1 is described with reference to FIGS. 5 and 6. FIG. 5 is a flow diagram showing a process for manufacturing an electrode sheet and polarizable electrode. FIG. 6 is a graph showing the relationship between a time period of kneading and a contact angle. The method is described as an example and other methods can be applied to the manufacturing process.

Process for Mixing Ingredients At a step S1, an electrochemically active material, an electrically conductive filler, a binder and additives as required are collected into a mixer and mixed uniformly, for example at several thousands rpm for about 20 minutes.

Mixing and Kneading Process

At a step S2, the ingredients mixed at the step S1 are kneaded by a machine for kneading, preferably two-axis machine, under heated conditions (for example 60–90 degrees centigrade), at a slow rotational speed (for example 10–40 rpm) and under reduced pressure conditions (for example 0.2–0.5 MPa), for a determined period of time.

As shown in FIG. 6, the contact angle increases according to the time period of kneading and reaches a peak, decreasing thereafter. Assuming that a desired range of contact angle is X, there are two time periods X1 and X2, during which the desired range can be achieved by conducting a kneading process. These two appear before and after the contact angle reaching the peak, respectively.

It is preferable to select the earlier one taking into account the deterioration of granules subjected to longer process and saving of process time.

It is noted that graphs shown in FIG. 6 is for the ingredients of exemplary composition, which were processed under predetermined conditions such as rotational speed and temperature. It is possible to determine a contact angle depending on the composition of ingredients and the conditions for process.

A graph similar to FIG. 6 can be obtained, by selecting rotational speed for horizontal axis and setting a constant value for the time period.

In this way, an electrode sheet E according to the present invention can be obtained, which includes granules having a desirable contact angle, by determining a kneading time period or a rotational speed.

By kneading ingredients under predetermined conditions, it is possible to produce relatively large granules used for the electrode sheet E, which are made of an electrochemically active material and an electrically conductive filler that are bound together by a softened binder.

Crushing Process

At a step S3, the relatively large particles of granules produced at the step S2 are crushed into an appropriate size of particles suitable for the electrode sheet E of electric double-layer capacitor 1.

Classification Process

The granules crushed at the step S3 include those unsuitable for the electrode sheet E, too fine or large granules. At a step S4, these granules are classified and eliminated. For example, granules having a particle diameter greater than 840 micron meters are eliminated using a sieve of aperture 840 micron meters. It is preferable to return the granules larger than 840 micron meters to the step S3 so that they can be subjected to another round of crushing. Subsequently, too fine granules are eliminated with another sieve of aperture 47 micron meters and thereby the granules satisfying the required range of particle diameter can be selected. It may be possible to return the eliminated granules to the step S2 so that they can be recycled.

The sequence of classification can be selectively determined. For example, finer granules are classified before larger ones, which is the opposite sequence of process compared to that described above.

Preliminary Forming Process

The granules subjected to the steps S1–S4 undergo preliminary forming at a step S6, being molded into a pre-electrode sheet.

It is possible to conduct forming at the step S6 by introducing a conventional method, for example a pair of rollers with a predetermined gap through which pass the granules for an electrode sheet E with a solution such as isopropanol.

Rolling Process

At a step S7, the pre-electrode sheet is rolled to a predetermined thickness. It is possible to conduct rolling process at the step S7 by making the pre-electrode sheet pass a conventional roller. For example, if the thickness of 130–160 micron meters for the electrode sheet E is desired, it is possible to make the thickness smaller gradually using three types of roller of different gaps. The rollers are laid out so that one having a smaller gap is situated downstream. This approach protects against defects such as breaking of the electrode sheet E since it precludes a chance of exerting sudden large load on the electrode sheet E.

It is not limited to the rolling process described above, in which the electrode sheet E passes through plural types of roller consecutively. Alternatively, it is possible to make the electrode sheet E pass through the rollers step by step.

The electrode sheet E described above, which is manufactured using granules that have the predetermined range of particle diameter without undesirably fine or large particle selected by a sieve, can be free from having fine particles on its surface.

Bonding Process

Next, polarizable electrodes 9 and 10 of the present invention are manufactured at a step S8 by bonding electrode sheets E with the collector foils 11 and 14. A bonding process shown in FIG. 5 is used, which has a first roller that applies an adhesive to the collector foils 11 and 14 in a predetermined thickness, and a second roller that conducts bonding by pressure for the collector foils 11 and 14 with the electrode sheets E.

In this connection, in a case where the collector foils 11 and 14, both surfaces of which are bonded with electrode sheets E, it may be possible to conduct the step S8 for one of the two surfaces at a time.

The collector foils 11 and 14 of polarizable electrodes 9 and 10, either one surface of which is bonded with an electrode sheet E or both surfaces of which are bonded with electrode sheets E, are dried using a conventional method. In this way, the manufacturing of polarizable electrodes 9 and 10 is completed.

Although the electrically conductive adhesive has been described above in the explanation for bonding of the electrode sheets E with collector foils 11 and 14, it may be possible to apply crimp instead of the adhesive.

Electrode samples have been manufactured and their characteristics have been studied by measurement. It is understood that the present invention should not be limited to the exemplary cases described below based on the samples.

Sample 1

Activated carbon having a median diameter of nearly 6 micron meters was used as an electrochemically active material, with which acetylene black as an electrically conductive filler and TEFLON (trade mark) as a binder were mixed. The composition ratio of these three materials, the activated carbon, the acetylene black and the TEFLON, was 82:8:10. This mixture added with isopropyl alcohol underwent a kneading process under pressurization for fibrillation of the TEFLON for 8 minutes, thereby resulting in a kneaded material.

The kneaded material was then crushed, becoming crushed powder having an average diameter of 0.5 mm. The crushed material was further added with isopropyl alcohol and was subjected to a calendar process so as to be a sheet-like molding. The molding underwent a rolling process, resulting in an electrode sheet. The electrode sheet was bonded to a collector foil, forming a polarizable electrode. A tape G-5780A made by Notape Co. Ltd. was used for bonding.

The polarizable electrode was cut to a desired length and rolled with two sheets of separator having a thickness of 50 micron meters. The rolled electrode was housed in an experimental casing, which was then subjected to a drying process under a vacuum condition at 160 degrees centigrade for 72 hours. An electrolytic solution, propylenecarbonate solution having a concentration of 1.8 mol/L of quaternary ammonium salt, was injected into the casing. In this way, an experimental electric double-layer capacitor was manufactured.

The experimental electric double-layer capacitor was then subjected to an impregnation process and an aging process for degassing. And its voltage and electrostatic capacity were measured. The contact angle was measured using a fixed camera which enlarged a droplet of nearly 20 micron litters of an electrolytic solution, which was held on the end of a micro syringe and attached on the surface of electrode sheet. The results are shown in FIGS. 7 and 8.

Other electrode sheets were manufactured, which had different kneading periods of time such as 2, 4, 6, 10 and 20 minutes, and their contact angle, electrical resistance and electrostatic capacity were measured. Also, other electrode sheets were manufactured with varied composition ratios of TEFLON such as 6, 12 and 16 percent, and the same measurement was conducted. The results are also shown in FIGS. 7 and 8.

The results of FIG. 7 show that the contact angle increases according to the kneading time period, and it starts decreasing when the time period exceeds 10 minutes (compare to FIG. 6). It is also known that the electrical resistance decreases as the contact angle decreases. It may be attributable to insufficient kneading that the electrostatic capacity is relatively small in the case of the time period of 2 minutes.

Similarly, the results of FIG. 8 show that that the contact angle and electrical resistance increase according to the amount of binder.

Samples 2–7

Mass ratio among activated carbon, acetylene black and TEFRON as well as kneading time period were varied according to FIG. 9 and the measurement was conducted. The results are shown in FIG. 9, FIGS. 10A–10C and FIGS. 11A–11C. The results of sample 1 are also shown in FIG. 9 along with those of samples 2–7.

It is known from FIG. 9, FIGS. 10A–10C and FIGS. 11A–11C that the amount of binder and the contact angle are correlated to each other. The results demonstrate that the larger the contact angle is, the higher the electrical resistance and the electrostatic static capacity are. When the contact angle is about 60 degrees, a balanced condition is achieved where the electrical resistance is compatible with electrostatic capacity.

What is claimed is:

1. An electrode sheet for an electric double-layer capacitor, the electrode sheet is molded from granules which are produced from ingredients comprising:

an electrochemically active material;

an electrically conductive filler; and a binder, wherein a contact angle is equal to or less than 100 degrees when the contact angle is defined as (180-ALPHA) degrees, where ALPHA represents an apex angle of a droplet of an electrolytic solution for the electric double-layer capacitor, and when the droplet lies on the electrode sheet.

2. A method for manufacturing an electrode sheet for an electric double-layer capacitor, the electrode sheet is molded from granules which are produced from ingredients including an electrochemically active material, an electrically conductive filler and a binder, the method comprising the steps of:

(a) kneading the ingredients so that the binder is subjected to fibrillation, and molding a lump out of the ingredients after the fibrillation;

(b) crushing the lump into granules for the electrode sheet of the electric double-layer capacitor; and (c) forming the granules into the electrode sheet, wherein one of a period of time and strength of kneading at the step (a) is adjusted so that a contact angle can be equal to or less than 100 degrees when the contact angle is defined as (180-ALPHA) degrees, where ALPHA represents an apex angle of a droplet of an electrolytic solution for the electric double-layer capacitor, and when the droplet lies on the electrode sheet.

3. A polarizable electrode for an electric double-layer capacitor comprising:

an electrode sheet molded from granules which are produced from ingredients including an electrochemically active material, an electrically conductive filler and a binder; and a collector foil which is bonded with the electrode sheet directly or via a layer of an adhesive so as to form the polarizable electrode, wherein a contact angle is equal to or less than 100 degrees when the contact angle is defined as (180-ALPHA) degrees, where ALPHA represents an apex angle of a droplet of an electrolytic solution for the electric double-layer capacitor, and when the droplet lies on the electrode sheet.

4. An electric double-layer capacitor comprising the polarizable electrode according to claim 3.

* * * * *